Patented Mar. 7, 1933

1,899,957

UNITED STATES PATENT OFFICE

IVAN GUBELMANN, OF SOUTH MILWAUKEE, AND WILLIAM L. RINTELMAN, OF MILWAUKEE, WISCONSIN, ASSIGNORS, BY MESNE ASSIGNMENTS, TO E. I. DU PONT DE NEMOURS & COMPANY, A CORPORATION OF DELAWARE

PROCESS FOR PREPARING ANTHRAQUINONE SULPHONIC ACIDS

No Drawing. Application filed December 14, 1928. Serial No. 326,148.

This invention relates to a process for preparing anthraquinone sulphonic acids and more particularly to the preparation of anthraquinone beta disulphonic acids in the form of a mixture containing principally the 2,6- and 2,7-disulphonic acids.

The heretofore described methods for preparing anthraquinone beta disulphonic acids in which anthraquinone has been employed as the starting material, possess certain disadvantages which are to a large extent overcome by the present invention. In sulphonating anthraquinone to produce a maximum quantity of the beta sulphonated product, there is always produced a certain amount of the alpha isomer. This alpha isomer upon further sulphonation gives a disulphonic acid having at least one sulphonic acid group in the alpha position. It is also well recognized that in the sulphonation of anthraquinone with oleum, a certain amount of oxidation of the organic molecule takes place to produce objectionable by-products, thereby lowering the yield and quality of the desired product. It is further known that in the sulphonation of anthraquinone to beta-sulphonic acids it is relatively difficult to sulphonate all of the anthraquinone without leaving small amounts of unchanged anthraquinone in the final product.

It is an object of the present invention to avoid or minimize the aforementioned objectionable features and to provide a method of preparing anthraquinone beta sulphonic acids in an economically practical manner, to the end that a higher yield of pure products is obtained.

It is a further object of this invention to provide a method of preparing the 2,6- and 2,7-disulphonic acid mixture in a more economically practical manner than has hitherto been proposed.

Other and further important objects of this invention will become apparent from the following description and appended claims.

If instead of employing anthraquinone as starting material there is employed anthraquinone-beta-sulphonic acid, remarkably improved results are obtained. This anthraquinone-beta-sulphonic acid may either be obtained by sulphonating anthraquinone to anthraquinone-beta-sulphonic acid followed by a separation of this body from impurities by any known method, or it may be obtained by a preferred method of condensing p'-sulpho-benzoyl-ortho-benzoic acid. The use of either anthraquinone-beta-sulphonic acid or p'-sulpho-benzoyl-ortho-benzoic acid as a starting material insures that at least one of the sulphonic acid groups in the final product is in the beta position. Furthermore the use of these starting materials makes it possible to reduce certain by-product formations that have hitherto taken place probably due to oxidation. Advantage is taken of these facts to increase the yield and quality of the final product.

The process when starting with p'-sulphobenzoyl-ortho-benzoic acid is preferably carried out in two continuous steps, the first step consisting in effecting a closing of the ring to form beta anthraquinone sulphonic acid. Without isolating this product, oleum is then added and the sulphonation to the disulpho body effected by reacting upon this product at an elevated temperature. The conditions, such as temperature and concentration of oleum, are subject to some variation. For instance, it is possible to carry out the reaction by adding all of the oleum at the start and then heating up to the desired temperature, but this is not to be preferred and gives less desirable results. The p'-sulpho-benzoyl-ortho-benzoic acid may be employed either in the form of the free acid or in the form of its mono or disodium salt. The latter is preferred for economic reasons.

The isolated anthraquinone disulphonic acids, either as a mixture or separated into the principal isomers, that is the 2,6- and 2,7-disulphonic acid, prepared according to our present process have been found to be entirely satisfactory for uses to which they are ordinarily put when prepared by the hitherto known processes.

Without limiting our invention to any specific procedure, the following examples, in which parts by weight are given, will serve to illustrate preferred embodiments of our invention.

Example I 10 parts of dry p'-sulpho-benzoyl-orthobenzoic acid (disodium salt) are introduced into 15 parts of 25% oleum, containing a trace of vanadium oxide, say 0.05 parts. This mixture is then heated to 150° C. and held at this temperature for three hours, at the end of which 20 parts of 60% oleum are added over a period of two to three hours and the mass held at 150° C. for four hours longer, care being taken that not more than a minimum of sulphur trioxide be lost by evaporation. The sulphonation mass is then cooled somewhat and poured into 80 parts of cold water. The diluted mass may be worked up to obtain the mixtures of 2,6- and 2,7-disulphonic acids or the two isomers may be separated by known methods.

Example II 10 parts of dry p'-sulpho-benzoyl-orthobenzoic acid (disodium salt) are introduced into 15 parts of 25% oleum, containing a trace of vanadium oxide, say 0.05 parts. This mixture is then heated to 150° C. and held at this temperature for three hours, at the end of which 10 parts of 60% oleum are added over a period of two to three hours and the mixture held at 150° C. for four hours longer, care being taken that not more than a minimum of sulphur trioxide be lost by evaporation. The sulphonation mass is then cooled somewhat and poured into 80 parts of cold water. The diluted mass may be worked up to obtain a mixture of 2,6- and 2,7- disulphonic acids or the two isomers may be separated by known methods.

Example III 10 parts of dry p'-sulpho-benzoyl-orthobenzoic acid (disodium salt) are introduced into 15 parts of 25% oleum. The mass is then heated to 150° C. and held at this temperature for three hours, after which 20 parts of 60% oleum are added over a period of two to three hours and the mixture held at 150° C. for four hours longer, care being taken that not more than a minimum of sulphur trioxide be lost by evaporation. The sulphonation mass is then cooled somewhat and poured into 80 parts of cold water. The diluted mass may be worked up to obtain the mixture of 2,6- and 2,7-disulphonic acids or the two isomers may be separated by known methods.

Example IV 10 parts of the dry sodium salt of anthraquinone-2-sulphonic acid are introduced in 20 parts of sulphuric acid monohydrate and the whole is warmed to 145–150° C. 10 parts of 60% oleum are then added over a period of two to three hours, the temperature being maintained at 150° C., and care being taken to minimize the loss of $SO_3$ by evaporation. The mass is then held at 145–150° C. four hours longer. The sulphonation mass is cooled somewhat and poured into 80 parts of cold water. The diluted mass may be worked up to obtain the mixture of 2,6- and 2,7-disulphonic acids, or the two isomers may be separated by known methods.

It will be obvious to those skilled in the art that other concentrations of sulphuric acid than those specified above may be employed either for the closing of the ring or for the subsequent sulphonation. It should be noted that the present invention employs smaller amounts of oleum to produce disulphonic acids than have hitherto been considered necessary, thereby conserving raw material and labor and utilizing the capacity of the equipment to better advantage.

It is known to us that other temperatures than those specifically mentioned in the examples may be employed. In using 25% oleum to close the ring, ring closing begins at about 75° C. As the strength of the oleum is reduced due to a water dilution, higher and higher temperatures are necessary to effect ring closing till a point is reached where the concentration of sulphuric acid falls below 100% with respect to the water content, there is then required a temperature above 100° C. to effect ring closing of all the benzoyl benzoic acid. The closing of the ring can be effected over a wide range of temperatures, say from 75 to 150° C. or above 150° C. depending upon the relative strength of sulphuric acid employed and the strength of the acid actually present in the ring closing mass. For the production of the disulphonic acids from this mixture it is obviously of advantage to employ an oleum for the first step for the reason that the total sulphonating agent required to perform the second step or disulphonation is then diminished. In a similar manner, other temperatures than 150° C. may be employed to effect the disulphonation. The actual temperature necessary will depend to a large extent on the strength of the oleum employed. With stronger oleum lower temperatures and with a weaker oleum higher temperatures may be employed to effect similar results as are obtained according to the specific examples described. This invention contemplates broadly the process of preparing anthraquinone-2,6 and 2,7-disulphonic acid mixtures from anthraquinone beta sulphonic acid and more specifically when the latter body is prepared by treating the p'-sulpho-benzoyl-ortho-benzoic acid with a condensing agent adapted to close the ring.

We are aware that numerous details of the process may be varied through a wide range without departing from the principles of this invention, and we, therefore, do not purpose limiting the patent granted hereon otherwise than necessitated by the prior art.

We claim as our invention:

1. The process of preparing a mixture of anthraquinone beta disulphonic acids which comprises heating a p'-sulpho-benzoyl-ortho-benzoic acid body in concentrated sulphuric acid and subsequently sulphonating.

2. The process of preparing a mixture of anthraquinone-beta-disulphonic acids which comprises treating a p'-sulpho-benzoyl-ortho-benzoic acid body with oleum at an elevated temperature.

3. The process of preparing anthraquinone-beta-disulphonic acids which comprises heating a p'-sulpho-benzoyl-ortho-benzoic acid body in sulphuric acid to a temperature of approximately 150° C. and sulphonating, without isolating intermediate bodies, to form a mixture of anthraquinone 2,6- and 2,7-disulphonic acids.

4. The process of preparing anthraquinone beta disulphonic acids which comprises heating a p'-sulpho-benzoyl-ortho-benzoic acid body with oleum to a temperature of approximately 150° C. to form a mixture of anthraquinone 2,6- and 2,7-disulphonic acids.

5. In the process or preparing anthraquinone-beta-disulphonic acids, the step of heating a p'-sulpho-benzoyl-ortho-benzoic acid in concentrated sulphuric acid to form anthraquinone beta sulphonic acid.

6. In the process of preparing anthraquinone beta disulphonic acids, the step of heating a p'-sulpho-benzoyl-ortho-benzoic acid body in oleum to a temperature of approximately 150° C. to form anthraquinone beta sulphonic acid.

7. In the process of preparing anthraquinone beta disulphonic acids, the step of heating the disodium salt of p'-sulpho-benzoyl-ortho-benzoic acid in concentrated sulphuric acid to form anthraquinone beta sulphonic acid.

8. In the process of preparing anthraquinone beta disulphonic acids, the step of heating the disodium salt of p'-sulpho-benzoyl-ortho-benzoic acid in oleum to a temperature of approximately 150° C. to form anthraquinone beta sulphonic acid.

9. In the process of preparing anthraquinone beta disulphonic acid, the steps of closing the ring of a p'-sulpho-benzoyl-ortho-benzoic acid body to form an anthraquinone beta sulphonic acid and subsequently sulphonating the intermediate product without isolation, to the anthraquinone 2,6- and 2,7-disulphonic acid mixture.

10. The process of preparing a mixture of 2,6- and 2,7-anthraquinone disulphonic acids which comprises heating p'-sulpho-benzoyl-ortho-benzoic acid with 25% oleum to ring close the same and heating the resulting ring closed product with 60% oleum.

11. The process of preparing a mixture of 2,6- and 2,7-anthraquinone disulphonic acids which comprises heating p'-sulpho-benzoyl-ortho-benzoic acid with 25% oleum at a temperature of approximately 150° C. to ring close the same and heating the resulting ring closed product at the same temperature with 60% oleum.

In testimony whereof we have hereunto subscribed our names at Carrollville, Milwaukee County, Wisconsin.

IVAN GUBELMANN.
WILLIAM L. RINTELMAN.